J. B. FORBES.
STUMP-PULLER.
No. 184,283.  Patented Nov. 14, 1876.
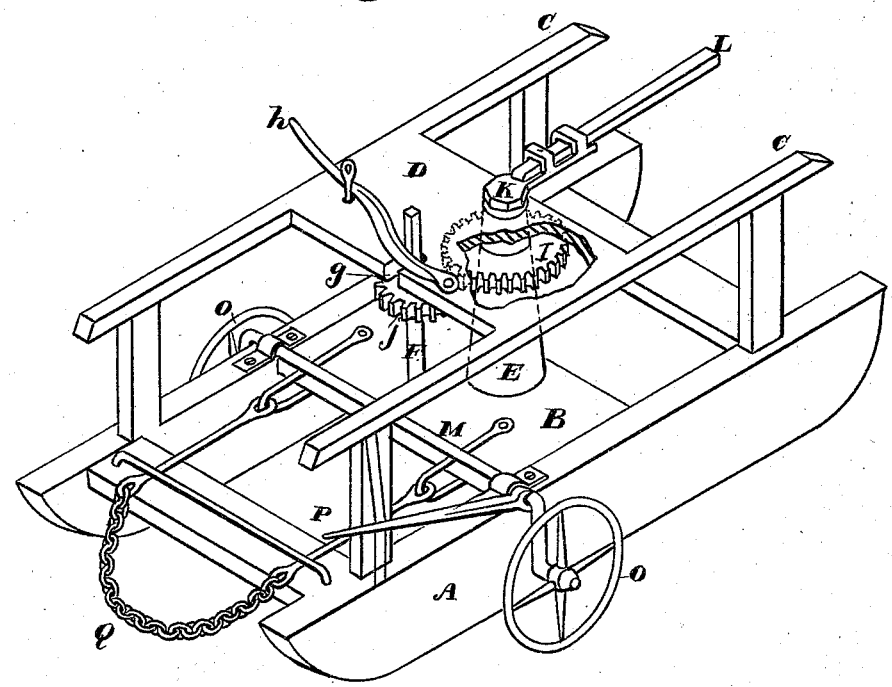

UNITED STATES PATENT OFFICE.

JOHN B. FORBES, OF OLYMPIA, WASHINGTON TERRITORY.

IMPROVEMENT IN STUMP-PULLERS.

Specification forming part of Letters Patent No. 184,283, dated November 14, 1876; application filed August 3, 1876.

*To all whom it may concern:*

Be it known that I, JOHN B. FORBES, of Olympia, Washington Territory, have invented an Improved Stump-Puller; and I do hereby declare the following description and accompanying drawings are sufficient to enable any person skilled in the art or science to which it most nearly appertains to make and use my said invention without further invention or experiment.

My invention relates to an improved machine for pulling stumps. It consists of a sled-frame, provided with adjustable wheels which can be raised or lowered, so that when desired the machine will rest upon the wheels. A capstan or windlass is mounted upon the frame, and I supply novel and convenient operating devices, all as hereinafter described.

Referring to the accompanying drawings, Figure 1 is a perspective view of my stump-puller.

Let A represent a sled, the two runners of which are connected at their middle by a strong timber or cross-piece, B. Upon each runner of the sled I construct a frame, C, and the upper timbers of this frame I connect by a cross-piece, D, directly above the cross-timber B of the runners. Between the two cross-pieces D B I mount an upright windlass or capstan, E, in the ordinary manner. Near this capstan I secure an upright shaft, F, the lower end of which steps in the lower cross-piece B, while its upper end is secured to the upper cross-piece by entering a slot, g, in the edge of the timber, where it is confined by a bar, h, one end of which is pivoted to the timber, so that it can be swung across the slot outside of the shaft, and have its opposite end secured by a pin, thus securing the upper end of the shaft in place.

To the upper end of the capstan E I secure a horizontal spur-wheel, I, and opposite this spur-wheel I secure a pinion, j, to the shaft F, so that when the shaft is in place the pinion will engage with the open wheel. The spindle k of the capstan extends above the upper cross-piece, while the upper end of the shaft F also projects above it to form a spindle.

In operation, if only a small amount of power is to be exerted, I remove the shaft F by removing the pin and swinging the bar h out of the way, so that the shaft can easily be taken out. I then apply the lever L to the spindle k of the capstan; but if the power required to be exerted is extreme I leave the shaft in place and apply the lever to its upper end. The power is therefore multiplied according to the proportion of the gears. M is an axle, which passes across the sled near one end. Both ends of this axle are cranks outside of the runners, and upon each crank I secure a wheel, O. A lever, P, is secured to one end of this axle, by means of which it can be rotated, so as to cause the cranks to lower the wheels below the runners or raise them above, as desired.

When the machine is in operation, the wheels O are raised so that the runners rest upon the ground. A chain, Q, serves as a means to anchor the machine permanently by passing it over a stump or other fixed object, after which any number of stumps near the machine can be pulled without moving the machine; but when it is desired to move the machine from one place to another, the wheels are lowered so that the weight of one end of the sled will be supported upon them, while the other end rests and drags upon the ground.

This machine is very simple, and can be used for various purposes upon a farm besides pulling stumps.

Having thus described my invention, what I claim, and desire to secure by Letters Patent, is—

1. In combination with a stump-puller, consisting of the sled A, with its cross-piece B, frames C, with the cross-piece D, and the upright windlass or capstan E, with its spur-wheel I, I claim the upright shaft F, with its pinion j stepped in the lower cross-timber, and having its upper end secured in the slot g of the upper cross-timber by means of the bar h and pin, substantially as and for the purposes described.

2. The sled A, with its capstan E, and having the cranked axle M, with its wheels O and lever P secured across it near one end, substantially as and for the purposes described.

In witness whereof I have hereunto set my hand and seal.

JOHN B. FORBES. [L. S.]

Witnesses:
E. MARSH,
H. L. CHAPMAN.